June 17, 1930.  P. D. LATIMER  1,765,080
BELT CONNECTION
Filed April 14, 1928

P. D. Latimer  Inventor.
Jesse R. Stone
Atty.

Patented June 17, 1930

1,765,080

UNITED STATES PATENT OFFICE

PAUL DAMEN LATIMER, OF ENNIS, TEXAS, ASSIGNOR OF SEVEN-TENTHS TO ROBERT NEEL BURNETT AND ONE-FOURTH TO A. M. BOWNAN, BOTH OF HOUSTON, TEXAS

BELT CONNECTION

Application filed April 14, 1928. Serial No. 270,028.

My invention relates to means for joining together the ends of belts.

It is an object of the invention to provide a belt connection whereby the ends of the belt may be joined together to make a butt joint.

It is desired to join the ends of the belt by means of an overlapping connection or saddle secured in position by rivets, nails or similar engaging devices, quickly and easily manipulated.

Figure 1:
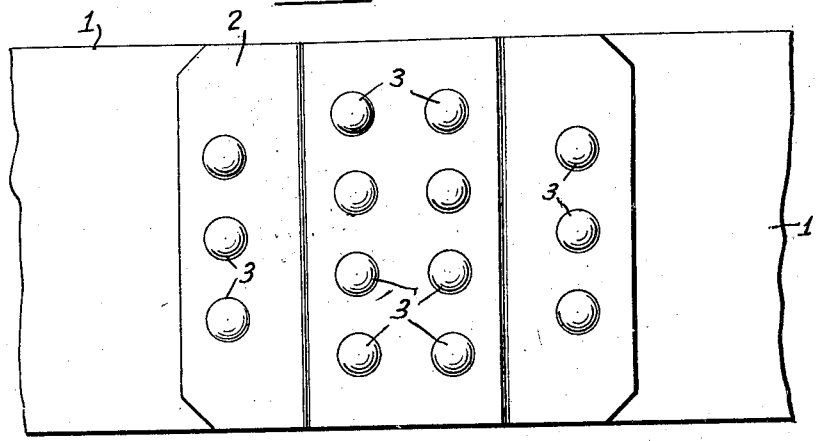
Figure 2:
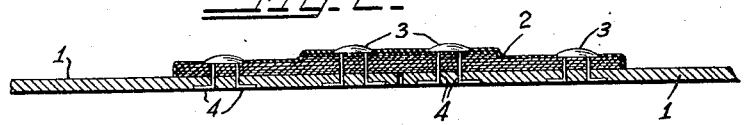
Figure 4:
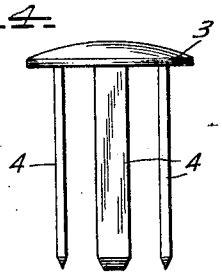
Figure 3:
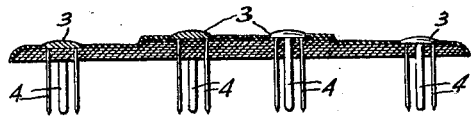
Figure 5:
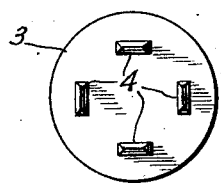

Referring to the drawing herewith, Fig. 1 is a top plan view of my invention as applied to the ends of the belt. Fig. 2 is a transverse section through the connections shown in Fig. 1. Fig. 3 is a similar view of the belt connection shown as ready to apply to the belt. Fig. 4 is a side elevation somewhat enlarged of one of the rivets employed in securing the connection in place, and Fig. 5 is a bottom view of the device shown in Fig. 4.

My invention is applicable to belts of any ordinary construction and I have shown the ends of a belt 1, which may be of leather, or some composition, or may even be of canvas or similar fabric impregnated in rubber. The meeting ends of the belt are cut off square so as to form a butt joint with the edges contacting for their full widths, and I contemplate forcing the ends of the belt into close contact in this manner by any desirable clamping device now in ordinary use.

When in this position my belt connection is placed centrally over the meeting line of the ends of the belt. This connection is of some pliable or flexible material and may be of similar construction to the belt. I have shown a connection or saddle 2 made up of layers or plys of tough flexible material, such as canvas, impregnated with rubber, and these pieces are of the full width of the belt. They may be of any desired length so as to overlap the meeting edges of the belt for the desired distance to make a firm connection. Centrally over the saddle or connecting member the thickness of the same is increased by adding an additional layer or several layers of the same material as is employed in the construction of the saddle.

In securing the connection to the belt ends while in this position nails, staples, rivets or the like may be employed, and I have shown a staple made up of the head 3, having on the under side thereof a plurality of legs 4, which are sharpened on their ends to readily pierce the connection and the belt, but which are adapted to be bent so as to clamp the layers of the belt and connecting member firmly together. As many of these rivets are employed as are necessary to secure the connecting member rigidly to the belt, and as will be seen from Fig. 1 a large number of these rivets may be employed closely adjacent to the meeting ends of the belt.

When this type of connecting member is employed in securing the belt ends together it will be obvious that a connection is made which will not easily break. Furthermore, as the connecting member is of flexible material, it will not interfere in any way with the operation of the belt, and its particular formation will prevent its catching upon adjacent objects. It is also obvious that a belt connection of this character may be removed from the belt if occasion arises without material difficulty. It has the advantage of being a substantial connecting member easily removed and not liable to breakage or excessive wear.

Having thus described my invention, what I claim as new is:

A belt connection wherein the ends of the belt are cut to form a belt joint, including a saddle made up of superposed layers of tough flexible material impregnated with rubber, and a plurality of layers shorter than the others adjacent the belt ends, and means extending through said layers and said belt to secure the said layers together and to said belt.

In testimony whereof I hereunto affix my signature this 9th day of April, A. D. 1928.

PAUL DAMEN LATIMER.